Dec. 8, 1959  E. V. SCHNEIDER  2,916,684
ARMATURE CONSTRUCTION
Filed Oct. 8, 1956  2 Sheets-Sheet 1

INVENTOR.
EMMOR V. SCHNEIDER
BY Woodling and Krost
attys.

Dec. 8, 1959 E. V. SCHNEIDER 2,916,684
ARMATURE CONSTRUCTION
Filed Oct. 8, 1956 2 Sheets-Sheet 2

INVENTOR.
EMMOR V. SCHNEIDER
BY Woodling and Krost,
attys.

United States Patent Office
2,916,684
Patented Dec. 8, 1959

2,916,684

ARMATURE CONSTRUCTION

Emmor V. Schneider, Alliance, Ohio, assignor to The Alliance Manufacturing Company, Division of Consolidated Electronics Corporation, Wilmington, Del.

Application October 8, 1956, Serial No. 614,404

8 Claims. (Cl. 318—325)

The invention relates in general to construction of an armature for a dynamoelectric machine and more particularly to a rotary armature construction for a direct current motor.

This rotary armature structure may be used in miniature motors wherein the field is provided by permanent magnets and with direct current supplied to the armature windings through a commutator. In such motors the prior art solutions have been unsatisfactory in many respects especially in speed regulation devices. The present invention contemplates a speed regulator or governor which will provide a wide range of speed control, yet provide symmetrical components so that the motor operates smoothly.

The prior art motors somewhat of this type had speed regulating systems which were defective in that, when the governor open circuited or short circuited certain windings to produce less torque whenever the speed became excessive, the torque developed by the motor produced forces which were not symmetrical with respect to the rotary structure of the armature of the motor. This caused net unbalanced forces to vibrate the rotor on its bearings and consequently to vibrate the entire motor.

Accordingly, an object of the invention is to provide a direct current motor controllable in speed by a governor which has first and second conditions each of which provides a symmetrical force or a couple to produce only torque on the motor axis to eliminate unwanted vibrations.

Another object of the invention is to provide a dynamoelectric machine armature which is operable through a speed regulating device or governor which provides current flow through the armature windings in first and second conditions each of which provides a symmetrical magnetic flux relative to the armature axis for cooperation with the field of the dynamoelectric machine.

Another object of the invention is to provide a motor with a plurality of windings on the armature and a governor construction which open circuits some of the windings to still provide a plurality of windings being energized which are symmetrically disposed relative to the axis of the armature.

Another object of the invention is to provide a simply constructed armature which may be used in miniature motors and which may be used with a governor for speed control.

Another object of the invention is to provide a direct current motor controlled in speed and of sufficiently smooth torque characteristics to be used with a phonograph drive without excessive wow, rumble, or flutter.

Still another object of the invention is to provide a six-pole armature in a permanent magnet motor wherein the six poles each have a winding, all of which are energized for speeds below a governor pre-determined speed and wherein two oppositely disposed windings are not energized during speeds in excess of this pre-determined speed.

Other objects and a fuller understanding of this invention may be had by referring to the following description and claims, taken in conjunction with the accompanying drawing, in which:

Figure 1:
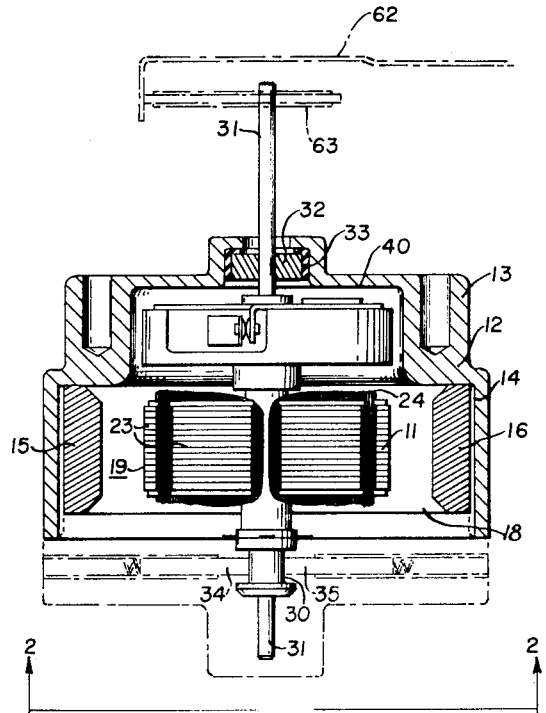
Figure 1 is a longitudinal sectional view of a motor incorporating the armature of the present invention.
Figure 3:
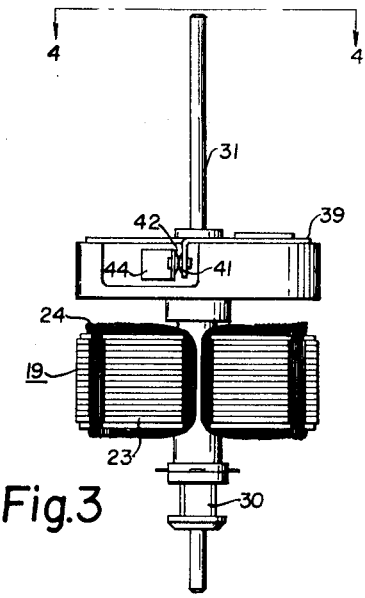
Figure 3 is a side view of the rotor removed from the motor of Figure 1.
Figure 4:
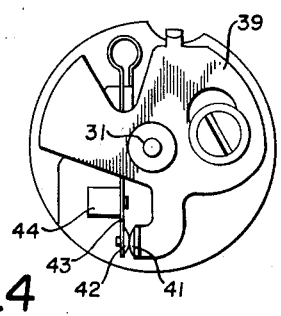
Figure 4 is a view on line 4—4 of Figure 3.
Figure 2:
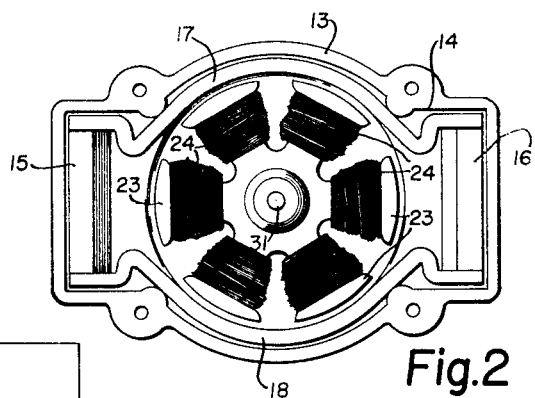
Figure 2 is a view along the line 2—2 of Figure 1.

Figures 1 through 4 show the physical construction of the armature 11 of the present invention which for purposes of illustration has been shown as being a rotary armature structure forming part of a complete motor or dynamoelectric machine 12. The motor 12 has a frame 13 which may be nonmagnetic, such as an aluminum or zinc die casting. A cavity 14 is provided in the frame 13 and contains first and second permanent magnets 15 and 16. These magnets are polarized along the length thereof; and the same poles such as north poles, are joined by a magnetic strap 17, and the other poles are joined by another magnetic strap 18. These magnetic straps with the magnets provide a unidirectional field through a permeable rotor 19 which is a part of the armature 11.

Figure 5:
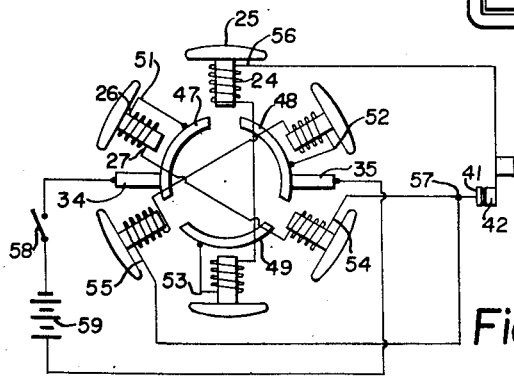
Figure 5 is a schematic diagram of a preferred circuit arrangement of the armature windings.

The rotor 19 has six symmetrically arranged salient poles 23 each carrying a winding 24. External pole faces 25 are provided on each of the salient poles 23 for cooperation with the magnetic straps 17 and 18. Each winding has outer and inner ends 26 and 27 such as is shown in Figure 5.

A commutator 30 is provided to rotate on a shaft 31 on which the rotor 19 is also mounted. This shaft 31 may be mounted in bearings such as the bearing 32 having a rubber-like sleeve 33 between the bearing 32 and the frame 13. In this particular case the preferred embodiment of the invention is to incorporate a six-winding armature with three segments on the commutator 30. Brushes 34 and 35 supply direct current energy to the commutator 30 and hence to the armature windings 24.

A governor or speed regulating device 39 is mounted for rotation on the shaft 31 within a cavity 40 in the frame 13. This governor 39 includes a first contact 41 which is fixed relative to the frame of the governor 39 and includes a second contact 42 mounted on a contact spring 43 also carrying a weight 44 so that centrifugal force will act on the contact 42 to provide first and second contact conditions above and below a pre-determined governor speed. In the governor illustrated this will be a closed circuit condition below a certain speed and an open circuit condition above this speed.

The motor of the present invention is particularly adaptable to miniature motors wherein the motor operates at relatively high speed. Accordingly, the diameter of the commutator 30 is kept as small as possible; and thus the width of the brushes 34 and 35, in order to have adequate current carrying capacity, is approximately half the arcuate width of a commutator segment.

The Figure 5 shows the preferred circuit for this armature structure 11 and rather schematically shows the commutator 30 as including commutator segments 47, 48, and 49. The salient poles 23 and the windings 24 thereon are symmetrically arranged relative to the axis of the shaft 31 and are also symmetrically arranged relative to the commutator segments. In this circuit of Figure 5 the inner ends 27 of diametrically opposing windings 24 are connected together. This provides three pairs of windings which are wound similarly to establish opposite magnetic poles on the diametrically opposed pole faces. This is for cooperation with the opposite poles of the field established at the magnetic straps 17 and 18. The three pairs of windings in Figure 5 have first ends 51, 52, and 53, respectively, which are connected to the commutator segments 47, 48, and 49. The second ends of these same three pairs of windings are designated by reference numerals 54, 55, and 56. The second end 54 and the second end 55 are connected together at a terminal 57 which is connected to the contact 41. The second end 56 of the third pair of windings is connected to the movable contact 42. Since the governor 39 rotates directly with the rotor 19, this connection may easily be effected by direct connection without resort to any slip rings. The brushes 34 and 35 bear against the commutator 30 and are connected externally through a switch 58 to a direct current source illustrated as a battery 59.

Many direct current motors, especially small or miniature motors, operate from batteries which have the characteristic of varying widely in output voltage during life or, if of the storage battery type, during discharge or charge conditions. For example, a six volt lead-acid storage battery is only nominally of six volt output and generally is about 6.2 volts open circuit voltage. On only a moderate discharge rate, such as one which will not discharge the battery for twenty hours, the terminal voltage drops to about 5.7 volts even when nearly fully charged, and will drop to about 5.1 volts upon being nearly discharged. On even a moderate charging rate, such as one which will charge the battery in about twenty-four hours, the terminal voltage is only about 6 volts on a fully discharged battery, and as the battery becomes nearly charged, the voltage rises to about 7.5 or 8 volts. This is a voltage variation of from twenty-five to thirty-five percent, and the voltage variation on primary batteries is nearly as great throughout their useful life.

The motor of the present invention operates quite satisfactorily on such wide voltage variation by the use of the governor 39 and the particular energization arrangement to the armature windings 24. Normally the contacts 41 and 42 are closed by the spring bias of the contact spring 43 and are opened by centrifugal force acting on the weight 44 above a pre-determined governor speed. The motor of the present invention may be used on such critical speed loads as a phonograph drive mechanism, such as is illustrated by the phonograph turntable 62 driven from the shaft 31 through an idler wheel 63. In such or similar applications it is desired to regulate the speed of the turntable 62 and hence of the motor 12 very closely, such as within one percent, despite widely varying input voltages. At speeds below the governor speed all windings 24 are energized in the circuit of Figure 5. This is because the contacts 41 and 42 are closed and the energization arrangement is such that each pair of windings is successively energized as the armature rotates. Above the predetermined governor speed the contacts 41 and 42 will open which interrupts energization to one of the pairs of windings having end terminals 53 and 56.

Considering the energization supplied to the armature 11 during excess speed conditions, when the contacts are open, it is found that the entire armature circuit is opened twice per revolution. This is as the commutator segment 49 passes by either brush 34 or 35. This makes the circuit through the armature open for approximately two-thirds of a revolution for the set of coils which are vertical in Figure 5. However, since the brushes 34 and 35 span two commutator segments a part of the time, two-thirds of the armature windings are effective at that time and one-third ineffective. Due to the width of the brush relative to the commutator segments, which is about half the width of the entire commutator segment, it is only in one-sixth of a revolution wherein the circuit is completely broken, but this occurs twice per revolution, once for each brush. This means that for approximately one-third of a revolution, about one-sixth plus one-sixth, there is no current in the armature windings. For the other two-thirds of a revolution there are only two-thirds of the armature windings effective. Two-thirds times two-thirds equals four-ninths, which means that about four-ninths of the power is available when the contacts are open as compared with the maximum power or torque available when the contacts are closed. Since this is a power function, the equivalent voltage change over which the governor can control the speed will be the square root of four-ninths or two thirds, which means that it is a speed controlled range of input voltage of from two-thirds to three-thirds the rated input voltage. In other words, on a 6 volt battery the speed controlled range would be about from 4 to 6 volts or from 5 to 7.5 volts, according to the selected rated input voltage.

It will be noted that the governor, when it opens the contacts 41 and 42, provides for de-energization of the pair of windings which are in the vertical plane and that these windings are symmetrically disposed. Also, it will be noted that the windings remaining energized are symmetrically disposed about the axis; and hence, the forces acting on the rotor are symmetrical, as in a couple, to produce only torque and eliminate any unbalanced force transverse to the axis which would cause vibration at the bearings 32. This is extremely desirable in many applications such as the phonograph drive shown, to eliminate wow, flutter, and rumble, and to maintain the shaft 31 parallel to and at a constant distance from the axis of the rotatable turntable 62.

Figure 6:
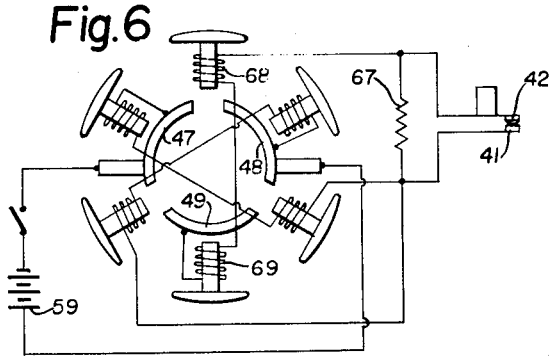
Figures 6 through 10 are schematic diagrams of alternative armature arrangements.

The Figure 6 shows a schematic diagram quite similar to that of Figure 5 with the addition of a resistor 67 connected across the contacts 41 and 42 to minimize any arcing at these contacts and to provide some energization to the windings 68 and 69 even though the contacts 41 and 42 are open. This arrangement can provide for even smoother and more closely controlled speed regulation.

In either of the circuit arrangements of Figures 5 or 6 the coils in each pair of windings may be connected in parallel for voltage or wire size consideration, if desired.

Figure 7:
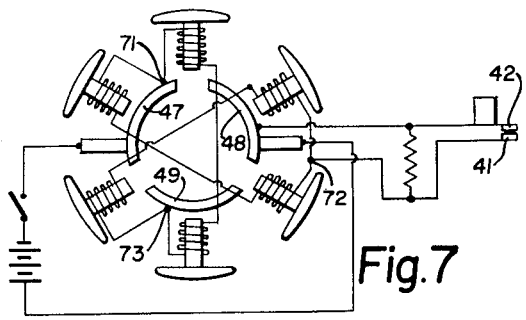

The schematic diagram of Figure 7 shows a shunt connection of the windings of armature 11 again with the inner ends of diametrically opposite windings connected together to make three pairs of symmetrically arranged windings. The outer ends of adjacent pairs of windings are connected together and connected together at terminals 71, 72, and 73. The terminals 71 and 73 are connected respectively to the commutator segments 47 and 49, whereas terminal 72 is connected to the commutator 48 through the governor contacts 41 and 42.

Figure 8:
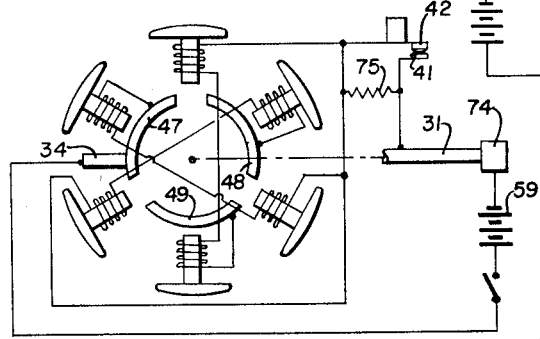

The Figure 8 shows still another schematic diagram where only a single brush 34 is used and the current return is through a bearing 74 on the shaft 31. With use of a resistor 75 across the contacts, this circuit is electrically similar to the circuit of Figure 6, and without this resistor, is similar to the circuit of Figure 5.

Figure 9:
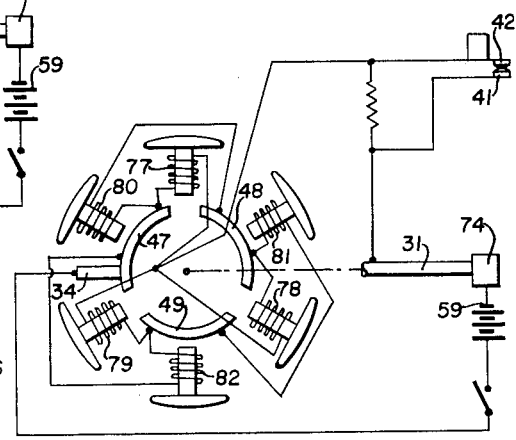

Figure 9 shows still another circuit arrangement employing a single brush 34 and the current return through the bearing 74 on the shaft 31. In this case the windings are arranged in a delta-star hookup with windings 77, 78, and 79 having their outer ends connected together and connected to one contact of the governor. The inner ends of these three windings are connected respectively to the commutator segments 47, 48, and 49. The inner ends of the other three symmetrically disposed windings 80, 81, and 82 are also connected to these same commutator segments, respectively, whereas the outer ends of these windings 80, 81, and 82 are connected respectively to the commutator segments 48, 49, and 47, respectively. This provides a delta energization arrangement of windings 80, 81, and 82 at all times, whereas the star energization to windings 77, 78, and 79 is only provided below the governor speed through the shaft bearing 74 when the governor contacts are closed. This interrupts energization above the governor speed to three of the windings instead of having all six windings energized as is the case below the governor pre-determined speed to provide a wide range of speed control.

Figure 10:
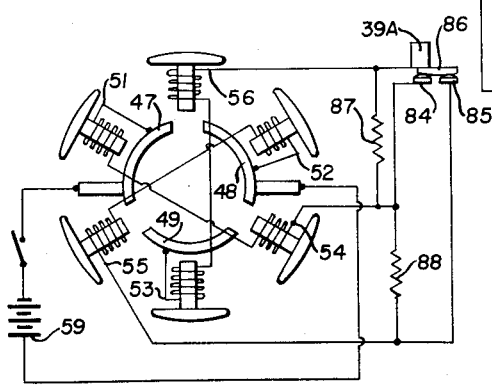

The Figure 10 shows a still further circuit arrangement again with oppositely disposed windings connected in series for three pairs of symmetrically arranged windings. This circuit is somewhat similar to that shown in Figure 5 wherein the first ends 51, 52, and 53 of the three pairs of windings are connected respectively to the commutator segments 47, 48, and 49. The second ends 54, 55, and 56 of these same pairs of windings are each connected to separate contacts 84, 85, and 86 on a governor 39A. In this case the contact 86 is shown as being a movable contact of the governor 39A and of sufficient width to substantially simultaneously engage the contacts 84 and 85. Above the pre-determined governor speed contact 86 will break contact with both contacts 84 and 85. Resistors 87 and 88 are shown bridging contacts 84 and 86 and contacts 84 and 85. This provides a current path for reduced energization of the windings when the contacts are opened by governor action. This will be reduced energization for a torque which still produces opposite and balanced forces transverse to the axis. Optionally, the resistors 87 and 88 may not be provided in which case complete de-energization of the armature windings is provided above the preset governor speed and again no unsymmetrical transverse forces will be provided above the governor preset speed.

It will be noticed that the many circuit arrangements provide a dynamoelectric machine which has been shown as a motor with current conditions in the armature windings such that a magnetic flux symmetrical relative to the axis is always obtained regardless of whether the governor contacts are open or closed. This symmetrical magnetic flux is that which combines with the field to cause torque when this dynamoelectric machine is used as a motor. This torque produces forces and eliminates unwanted vibrations and permits the armature of the present invention to be used in motors with critical speed regulation and applications wherein the load to be driven must have a minimum of vibration and net unbalanced transverse forces applied thereto.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A motor including a rotary armature structure having symmetrically arranged pole structures each with a pole face for cooperating with a stationary unidirectional field, six windings on said pole structures, a three segment commutator mounted for rotation with said armature, means for connecting diametrically opposite of said windings in series for establishing three pairs of windings with opposite magnetic poles on diametrically opposed pole faces, first and second cooperable contacts, means for connecting said pairs of windings to said commutator segments, governor means with first and second alternative conditions to act on one of said contacts, and means for connecting the said pairs of windings to said contacts for establishing first and second different torque conditions each of which produces forces symmetrical relative to the axis of said rotary armature.

2. A motor including a rotary armature structure having symmetrically arranged pole structures each with a pole face for cooperating with a stationary unidirectional field, six windings on said pole structures, a three segment commutator mounted for rotation with said armature, means for connecting diametrically opposite of said windings in series for establishing three pairs of windings with opposite magnetic poles on diametrically opposed pole faces, first and second ends on each of said three pairs of windings, first and second cooperable contacts rotating with said armature, means for connecting said first end of each of the three pairs of windings to a different commutator segment, governor means with first and second alternative conditions to act on one of said contacts, and means for connecting the said pairs of windings to said contacts for establishing first and second different torque conditions each of which produces forces symmetrical relative to the axis of said rotary armature.

3. A motor including a stator and a rotor with one thereof including a unidirectional field, an armature on the other of said stator and rotor and having an even number of symmetrically arranged windings, a commutator having half said even number of segments and mounted for rotation with said rotor, means for connecting diametrically opposite of said windings in series for establishing pairs of windings with opposite magnetic poles, first and second ends on each of said pairs of windings, first and second cooperable contacts rotating with said rotor, means for connecting said first end of each said pairs of windings to a different commutator segment, means for connecting the second ends of at least one of said pairs of windings to said first contact, means for connecting said second end of another pair of windings to said second contact, brush means for supplying electrical energy to said commutator, and governor means to cause centrifugal force to act on one of said contacts to open circuit said contacts, whereby during rotation in excess of a predetermined speed energization to said pairs of windings is successively interrupted.

4. A permanent magnet motor including a stator and a rotor, a permanent magnet two pole field on one of said stator and rotor, an armature structure on the other of said stator and rotor and having six symmetrically arranged salient pole structures each with a pole face for cooperating with said permanent magnet field, a winding on each of said six pole structures, means for connecting diametrically opposite of said windings in series and wound similarly for establishing three pairs of windings with opposite magnet poles on diametrically opposed pole faces, first and second ends on each of said three pairs of windings with said first ends symmetrically disposed, first and second cooperable contacts, means for connecting said pairs of windings to said contacts, governor means to cause centrifugal force to act on one of said contacts to open circuit said contacts, and means including said contacts to successively energize said pairs of windings, whereby during rotation in excess of a predetermined speed energization to said pairs of windings is successively interrupted part of the time and the remaining time two of said three pairs of windings are energized to provide variable output power for a speed controlled range of variable input voltage.

5. A motor including a rotor structure having six symmetrically arranged windings for cooperating with a stator, a three segment commutator mounted for rotation with said rotor, means for connecting diametrically opposite of said windings in series for establishing three pairs of windings with opposite magnetic poles, first and second ends on each of said three pairs of windings, first and second cooperable contacts, means for connecting said first end of each of the three pairs of windings to a different commutator segment, means for connecting the second ends of two of said pairs of windings to said first contact, means for connecting said second end of the third pair of windings to said second contact, brush means for supplying electrical energy to said commutator, and governor means to cause centrifugal force to act on one of said contacts to open circuit said contacts, whereby during rotation in excess of a predetermined speed energization to said pairs of windings is successively interrupted.

6. A motor including a rotary armature structure having six symmetrically arranged pole structures each with a pole face for cooperating with a stationary unidirectional field, a winding on each of said six pole structures, a three segment commutator mounted for rotation with said armature, means for connecting diametrically opposite of said windings in series for establishing three pairs of windings with opposite magnetic poles on diametrically opposed pole faces, first and second ends on each of said three pairs of windings, first and second cooperable contacts rotating with said armature, means for connecting said first end of each of the three pairs of windings to a different commutator segment, means for connecting the second ends of two of said pairs of windings to said first contact, means for connecting said second end of the third pair of windings to said second contact, brush means for supplying direct current electrical energy to said commutator, and governor means to cause centrifugal force to act on one of said contacts to open circuit said contacts, whereby during rotation in excess of a predetermined speed energization to said pairs of windings is successively interrupted.

7. A permanent magnet motor including a rotary armature structure having six symmetrically arranged salient pole structures each with a pole face for cooperating with a stationary permanent magnet field, a winding on each of said six pole structures, a three segment commutator mounted for rotation with said armature, means for connecting diametrically opposite of said windings in series and wound similarly for establishing three pairs of windings with opposite magnetic poles on diametrically opposed pole faces, first and second ends on each of said three pairs of windings, a governor including first and second cooperable contacts rotating with said armature, means to cause centrifugal force to act on one of said contacts to open circuit said contacts, means for connecting said first end of each of the three pairs of windings to a different commutator segment, means for connecting the second ends of two of said pairs of windings to said first contact, means for connecting said second end of the third pair of windings to second said contact, and diametrically opposed brushes for supplying direct current electrical energy to said commutator.

8. A permanent magnet motor including a rotary armature structure having six symmetrically arranged salient pole structures each with a pole face for cooperating with a stationary permanent magnet two pole unidirectional field, a winding on each of said six pole structures, a three segment commutator symmetrically disposed relative to said pole structures and mounted for rotation with said armature, means for connecting diametrically opposite of said windings in series and wound similarly for establishing three pairs of windings with opposite magnetic poles on diametrically opposed pole faces, first and second ends on each of said three pairs of windings with the first ends symmetrically disposed, only first and second cooperable contacts rotating with said armature, means for connecting said first end of each of the three pairs of windings to a different commutator segment, means for connecting the second ends of two of said pairs of windings to said first contact, means for connecting said second end of the third pair of windings to said second contact, diametrically opposed brushes having an arcuate extent approximately one-half a commutator segment for supplying direct current electrical energy to said commutator, and governor means to cause centrifugal force to act on one of said contacts to open circuit said contacts, whereby during rotation in excess of a predetermined governor speed energization to said pairs of windings is successively interrupted part of the time and the remaining time two of said three pairs of windings are energized to provide variable output power for a speed controlled range of variable input voltage.

References Cited in the file of this patent

UNITED STATES PATENTS

| | | |
|---|---|---|
| 2,552,296 | Russell | May 8, 1951 |
| 2,738,391 | Tesh | Mar. 13, 1956 |
| 2,819,441 | Buck | Jan. 7, 1958 |